United States Patent [19]

Sato et al.

[11] Patent Number: 4,887,165
[45] Date of Patent: Dec. 12, 1989

[54] DOCUMENT EDITING APPARATUS HAVING DETACHABLE IMAGE READER

[75] Inventors: Tomio Sato, Takahagi; Shigeru Matsuoka, Hitachi; Eiji Matsuda, Takahagi; Hitoshi Yonenaga, Hitachi, all of Japan

[73] Assignee: Hitachi, Ltd., Tokyo, Japan

[21] Appl. No.: 196,260

[22] Filed: May 20, 1988

[30] Foreign Application Priority Data

May 25, 1987 [JP] Japan .................. 62-125885

[51] Int. Cl.⁴ .................................. H04N 1/04
[52] U.S. Cl. ........................ 358/474; 382/59; 358/443
[58] Field of Search .......... 358/285, 257, 293, 294, 358/256; 382/59

[56] References Cited

U.S. PATENT DOCUMENTS

| | | | |
|---|---|---|---|
| 3,238,501 | 3/1966 | Mak | 358/285 |
| 3,541,248 | 9/1967 | Young | 358/285 |
| 3,767,020 | 10/1973 | Rowe | 197/1 R |
| 4,136,261 | 1/1979 | Wada | 358/256 |
| 4,419,697 | 12/1983 | Wada | 358/257 |
| 4,490,746 | 12/1984 | Moriguchi | 358/257 |
| 4,626,925 | 12/1986 | Toyoda | 358/285 |
| 4,639,790 | 1/1987 | Kusaka | 358/285 |
| 4,641,197 | 2/1987 | Miyagi | 358/256 |
| 4,652,937 | 3/1987 | Shimura | 358/293 |
| 4,655,577 | 4/1987 | Ikuta | 358/296 |
| 4,707,747 | 11/1987 | Rockwell, III | 358/293 |
| 4,711,560 | 12/1987 | Hosaka | 355/14 R |
| 4,731,668 | 3/1988 | Satomura | 382/59 |
| 4,742,559 | 5/1988 | Fujiwara | 358/294 |
| 4,757,532 | 7/1988 | Gilham | 380/23 |
| 4,785,357 | 11/1988 | Dreyfus et al. | 358/285 |
| 4,793,812 | 12/1988 | Sussman et al. | 358/293 |
| 4,831,459 | 5/1989 | Kimura | 358/293 |

FOREIGN PATENT DOCUMENTS 61-164368 7/1986 Japan .

Primary Examiner—Edward L. Coles, Sr.
Assistant Examiner—Jerome Grant, II
Attorney, Agent, or Firm—Antonelli, Terry & Wands

[57] ABSTRACT

A document editing apparatus comprises an apparatus body, an image reader and a detachable signal cable disconnectably connecting the image reader to the apparatus body. The image reader comprises an image sensor, a connector for connection to an externally inserted card-type semiconductor memory integrated circuit package for storing image data, a selector switch for selecting image data to be stored, a light-emitting diode for displaying an insufficient residual memory capacity of the package, and a control circuit. Image data read by the image sensor is selectively stored in the semiconductor memory integrated circuit package inserted into the image reader or in the apparatus body.

6 Claims, 6 Drawing Sheets

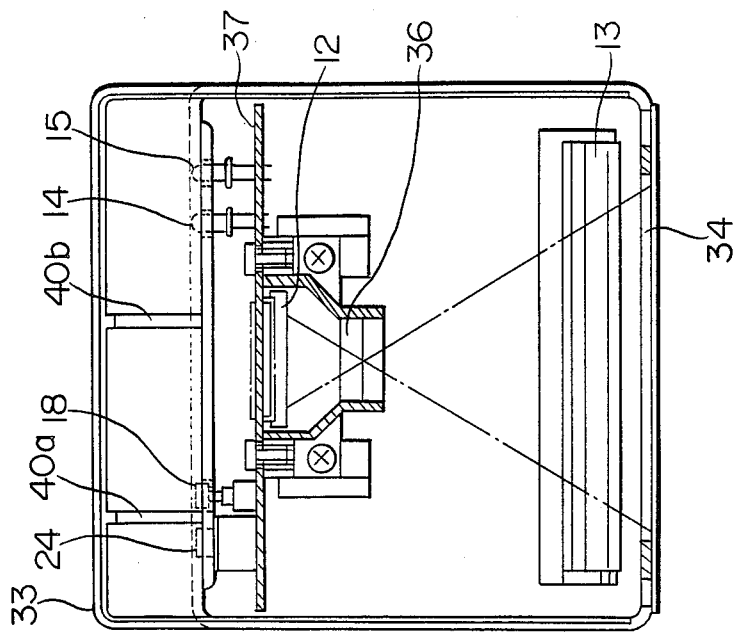
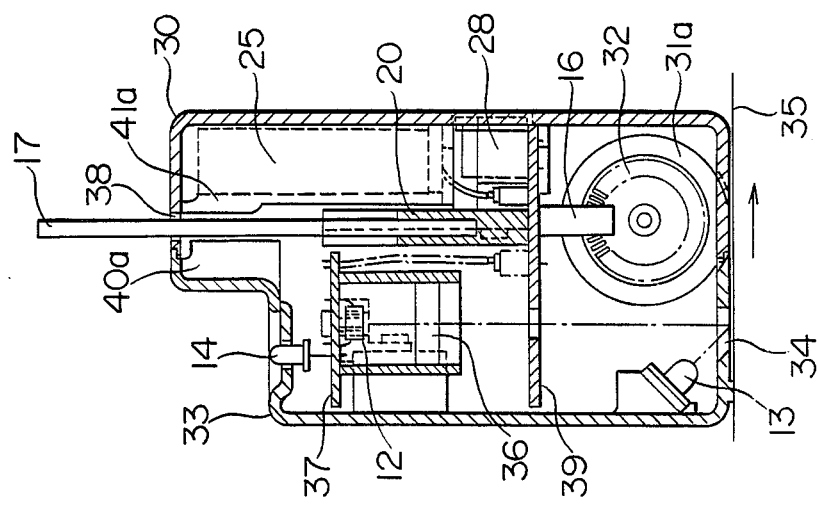
FIG. 3C
FIG. 3B

DOCUMENT EDITING APPARATUS HAVING DETACHABLE IMAGE READER

BACKGROUND OF THE INVENTION

1. Field of the Invention

This invention relates to a document editing apparatus, such as a word processor or a personal computer, of a type which can read characters and patterns on an original document by an image reader and which can display, edit and store image data read by the image reader. More particularly, this invention relates to a document editing apparatus comprising an image reader which can be used at a place remote from the body of the document editing apparatus.

2. Description of the Related Art

Most of the document editing apparatus, such as word processors or personal computers, which have rapidly come into wide use in recent years are provided with an image reader. Image readers are broadly classified into a large stationary type and a small portable type. The present invention is directed to the image reader of the small portable type (which is referred to hereinafter as a hand scanner).

The hand scanner, which is grasped by the hand of an operator and moved over an original document to read characters and patterns drawn on the original document, is preferably as small in size and light in weight as possible. For this reason, the hand scanner itself is not provided with a memory, and image data read by the hand scanner is transferred by a signal cable to the body of a document editing apparatus. However, in such a document editing apparatus, the hand scanner must be always used in a state connected with the body of the document editing apparatus, and this is inconvenient for the operator who handles the hand scanner.

As an alternative to deal with such a problem, JP-A-61-164368 proposes a hand scanner provided with a memory. Thus, in the proposed hand scanner, a memory IC or a floppy disk device is incorporated in its memory part to store image data read by the hand scanner. However, when the size of the hand scanner using the memory IC in its memory part is selected to be handy to carry in the hand of an operator, the memory capacity that can be incorporated in the hand scanner is so small or capable of only storing image data corresponding to about a quarter of a sheet of size A4 paper according to the JIS (Japanese Industrial Standards). Therefore, the proposed hand scanner is inconvenient in that it cannot be used to read a large quantity of characters and patterns from an original document at a place remote from the body of the document editing apparatus. On the other hand, when the floppy disk device is used in the memory part of the hand scanner, the overall size of the hand scanner becomes inevitably large due to the large size of the floppy disk drive. Also, because the power supply unit for the floppy disk drive is large in size and heavy in weight, the hand scanner is not handy to carry by the hand of the operator.

SUMMARY OF THE INVENTION

It is an object of the present invention to provide a document editing apparatus comprising an image reader which is handy to carry by the hand of an operator, which can read a large quantity of characters and patterns from an original document and which can store the read image data in its memory part.

More concretely, the image reader, which is small in size and light in weight, can read a large quantity of characters and patterns from an original document even when it is disconnected from the body of the document editing apparatus and can selectively store the read image data in its memory part.

Also, when the image reader is used in a state connected to the body of the document editing apparatus, image data read by the image reader or image data read out from the memory part of the image reader is transferred to the body of the document editing apparatus so that the image data can be displayed, edited and stored.

In accordance with the present invention, there is provided a document editing apparatus comprising an apparatus body including means for displaying, editing and storing image data, an image reader disposed separately from the apparatus body so as to be freely movable over an original document and including an image sensor for photoelectrically converting characters and patterns drawn on the original document into image data, a memory part for storing the image data, a control circuit for controlling the image sensor and the memory part, and a detachable signal cable disconnectably connecting the image reader to the apparatus body, the image reader comprising memory connecting means for detachably connecting an externally inserted, card-type semiconductor memory integrated circuit package to the image reader, package detachment detecting means for detecting whether or not the semiconductor memory integrated circuit package is detached from the memory connecting means, selector switch means for applying a selection instruction instructing selection of image data to be stored in the semiconductor memory integrated circuit package, memory status informing means for informing of the status of the semiconductor memory integrated circuit package, and a control circuit connected to the memory connecting means, the package detachment detecting means, the selector switch means and the memory status informing means, the control circuit executing the steps of confirming whether or not the semiconductor memory integrated circuit package is connected to the memory connecting means on the basis from an output signal of the package detachment detecting means when the image data selected on the basis of the selection instruction applied from the selector switch means is to be stored in the semiconductor memory integrated circuit package, comparing, when the connection is confirmed, the residual memory capacity of the semiconductor memory integrated circuit package with the quantity of the image data to be stored in the semiconductor memory integrated circuit package, and actuating the memory status informing means to inform of an abnormal status when the semiconductor memory integrated circuit package is not connected to the memory connecting means or when the residual memory capacity of the semiconductor memory integrated circuit package is insufficient for storing the image data.

BRIEF DESCRIPTION OF THE DRAWINGS

FIGS. 3A, 3B and 3C are a sectional front elevation view, a sectional side elevation view and a sectional back elevation view, respectively, showing the internal structure of the image reader.

DESCRIPTION OF THE PREFERRED EMBODIMENTS

An embodiment of the present invention will now be described in detail with reference to the drawings.

Figure 1:
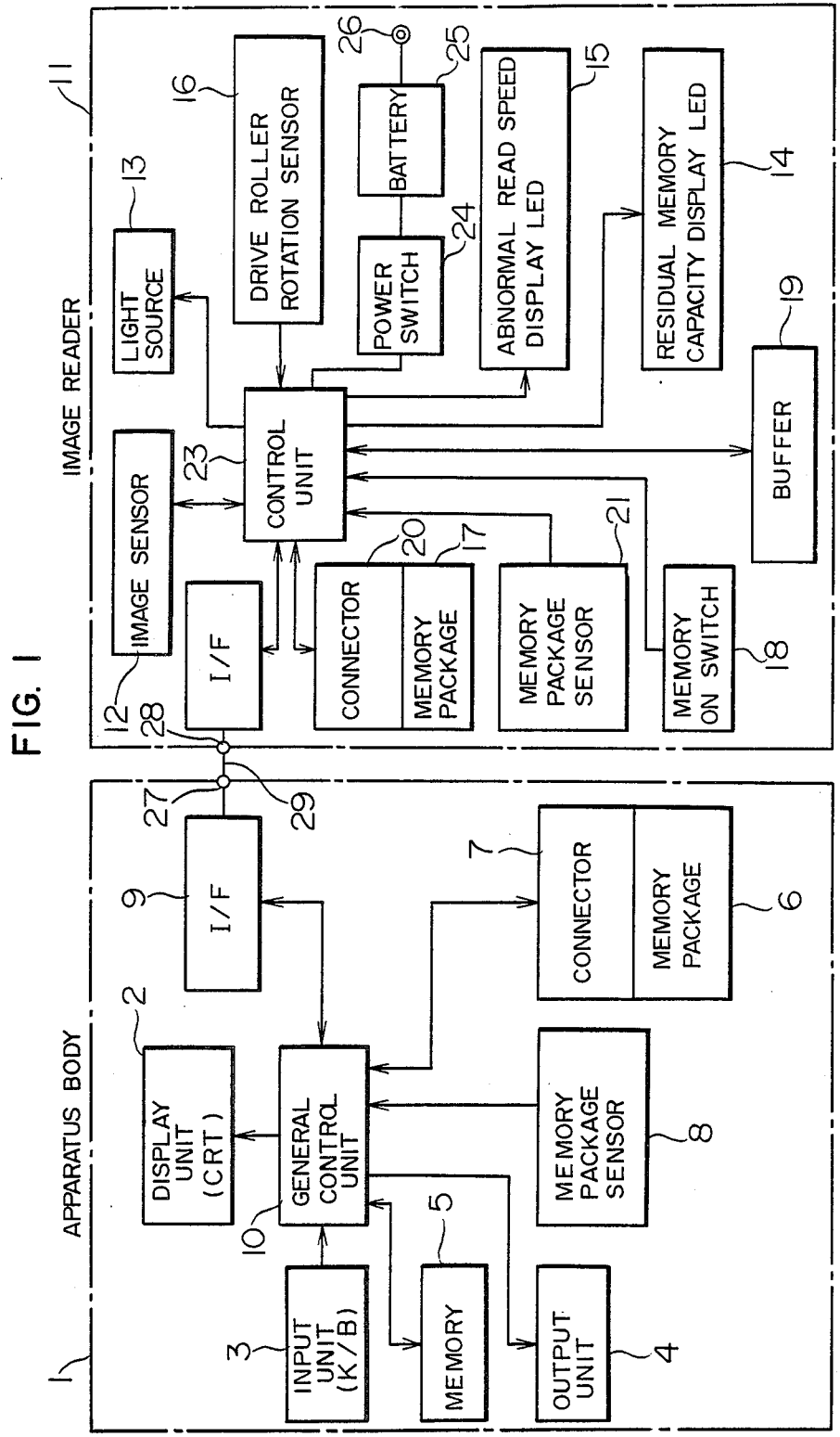
FIG. 1 is a block diagram of an embodiment of the document editing apparatus according to the present invention.

FIG. 1 is a block diagram schematically showing the structure of a document editing apparatus such as a word processor having the image reading function according to the present invention.

Referring to FIG. 1, the body of the document editing apparatus is generally designated by the reference numeral 1 and includes a display unit 2 (referred to hereinafter as a CRT) displaying, images such as those of characters and patterns, a keyboard input unit 3 (referred to hereinafter as K/B) used to input character data, pattern data, control instructions, etc., an output unit 4 used to print out image data such as those of characters and patterns, and a memory unit 5 for storing image data such as those of characters and patterns, programs, etc. The body 1 of the document editing apparatus further includes a memory connector 7 into which a semiconductor memory integrated circuit package 6 (referred to hereinafter as a memory package) for storing image data read by an image reader 11 (described later) or having image data already stored therein is detachably inserted, a sensor 8 for sensing whether or not the memory package 6 is inserted into the memory connector 7, an interface 9 (referred to hereinafter as an I/F) between the body 1 of the document editing apparatus and the image reader 11 (described later), a general control unit 10 for controlling all of the parts described above, and a cable connector 27. The general control unit 10 includes a microprocessor as its essential component.

The body 1 of the document editing apparatus carries out a basic document editing process similar to that carried out by a conventional wordprocessor by executing programs, which are set in the memory unit 5, by the microprocessor provided in the general control unit 10. Further, there are provided additional programs, according to the present invention, which are executed according to an instruction inputted by the K/B 3, when the image reader 11 is connected thereto through the I/F 9, as mentioned hereinafter, for receiving image data from the image reader 11, displaying the received image data on the CRT 2, editing and printing by the output unit 4 and storing in the memory unit 5.

The image reader 11 includes an image sensor 12, a light source 13 for illuminating an original document, a light-emitting diode 14 used to display whether or not a memory package 17 is connected to a memory connector 20 (described later) and whether or not the residual memory capacity of the memory package 17 is sufficient to further store image data, another light-emitting diode 15 used to display the fact that the image reading speed of the image reader 11 is not normal, a sensor 16 for detecting rotation of drive rollers (described later), a memory ON switch 18 for sending an instruction signal for selectively storing necessary image data only in the memory package 17, and a buffer memory 19 for temporarily storing image data. The image reader 11 further includes a memory connector 20 for detachably connecting the memory package 17 to the image reader 11 for storing image data, a sensor 21 for sensing the fact that the memory package 17 is inserted into the memory connector 20, an interface 22 (referred to hereinafter as an I/F) between the body 1 of the document editing apparatus and the image reader 11, a control unit 23 for controlling all of the parts described above, a power supply on-off switch 24, a chargeable battery 25, a charging connector 26, and a cable connector 28. The control unit 23 includes a microprocessor as its essential component. The body 1 of the document editing apparatus and the image reader 11 are connected by a signal cable 29 detachably connected between the connectors 27 and 28. Each of the elements constituting the image reader 11 may be made of any well-known structure and hence no detailed explanation thereof is presented.

Figure 2:
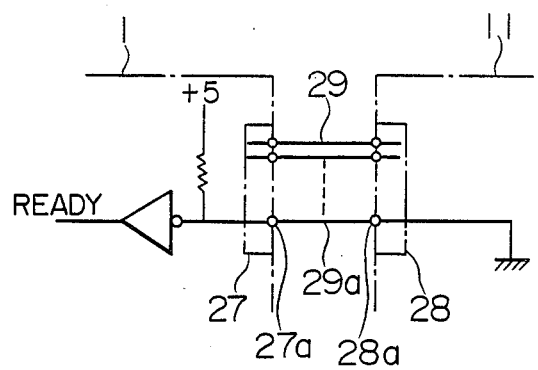
FIG. 2 is a circuit diagram of a connection detecting circuit for detecting whether or not the image reader is connected to the body of the document editing apparatus shown in FIG. 1.
Figure 3A:
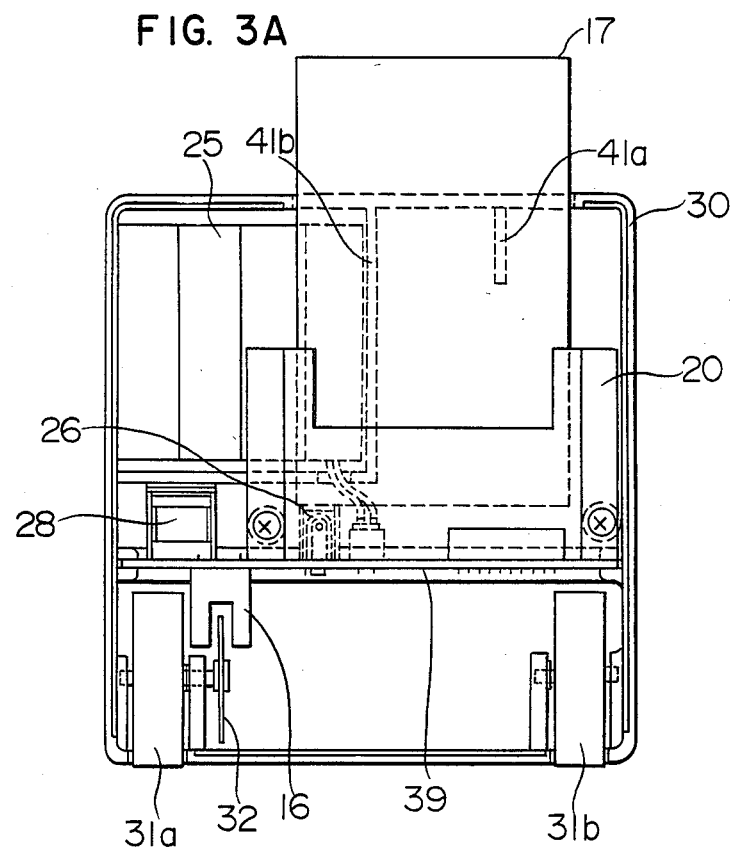
Figure 4A:
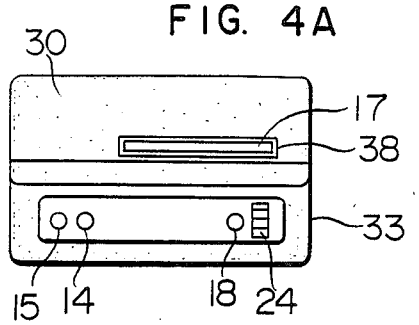
FIGS. 4A, 4B, 4C and 4D are a top plan view, a front elevation view, a side elevation view and a back elevation view, respectively, showing the external appearance of the image reader.
Figure 4B:
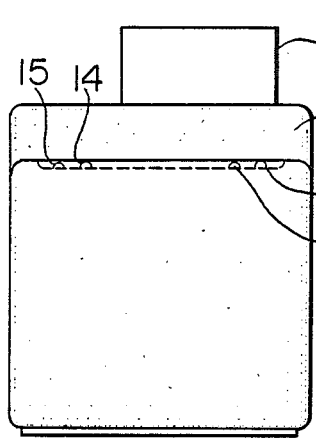
Figure 4C:
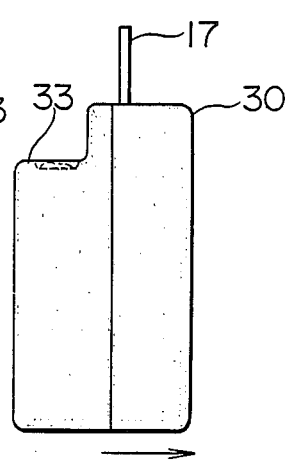
Figure 4D:
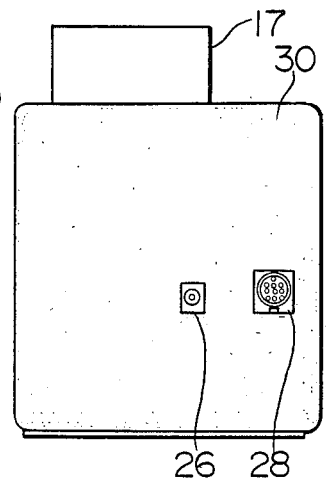

In order that the general control unit 10 disposed in the body 1 of the document editing apparatus can recognize whether or not the image reader 11 is connected to the body 1 of the document editing apparatus by the signal cable 29 connected between the connectors 27 and 28, the connector 28, the signal cable 29 and the connector 27 are provided with a grounded terminal 28a, a grounding wire 29a and a grounding detection terminal 27a respectively, as shown in FIG. 2. When the image reader 11 is connected to the body 1 of the document editing apparatus by the signal cable 29, a signal READY of high level appears.

FIGS. 3A, 3B, 3C and FIGS. 4A, 4B, 4C, 4D show the internal structure and the external appearance respectively of the image reader 11 employed in the document editing apparatus of the present invention which may be a word processor as described already. The image reader 11 has a front casing 33 and a rear casing 30. In a rear part of the lower casing 30, a pair of spaced left-hand and right-hand drive roller 31a and 31b are provided. A slitted disc 32 is mechanically coupled with the rotation axis of the roller 31a to rotate in integral relation with the roller 31a. The drive-roller rotation sensor 16 includes a light source and a photosensitive element which are located at the opposite sides of the slitted disc 32 so that the photosensitive element receives the light of the light source through the slits of the slitted disc 32 intermittently, when the disc 32 rotates with rotation of the drive roller 31a, thereby producing electric pulses at a frequency corresponding to the rotation speed of the drive roller 31a. At the bottom of the front casing 33, an opening 34 in the form of a slit is bored in a relation perpendicular with respect to the direction of movement (shown by the arrow in FIG. 3B) of the image reader 11. At a location inner relative to this opening 34, the light source 13 for illuminating an original document 35 is provided. This light source 13 is, for example, an array of light-emitting diodes. A lens 36 is located at a position capable of receiving the beam of light reflected from the original document 35 and passed through the opening 34, and the image sensor 12, supported on a sensor support plate 37, is disposed in the plane where the reflected beam of light is focused. The power supply on-off switch 24 and memory ON switch 18, both being menually operated, the light-emitting diode 14 displaying the status of the memory package 17, and the light-emitting diode 15 displaying a abnormal reading speed are also mounted on the sensor support plate 37.

Figure 5:
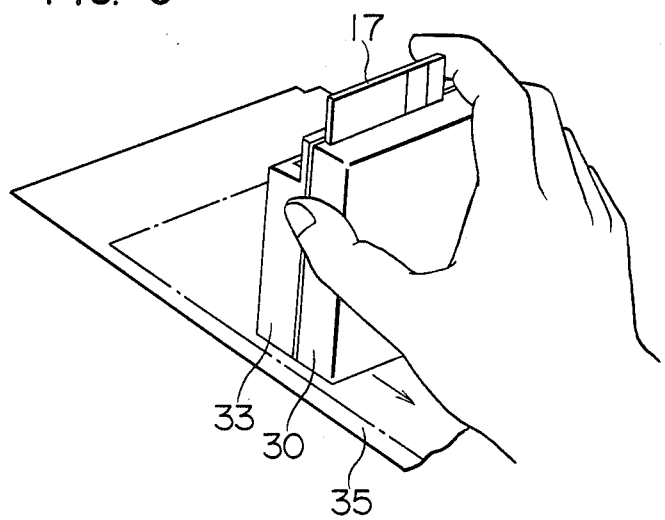
FIG. 5 is a perspective view of part of the image reader during use.

Further, in the rear casing 30, the memory connector 20 for connecting the memory package 17 inserted through an opening 38, the charging connector 26, the cable connector 28 for connection to the cable connector 27 in the apparatus body 1, and the rotation sensor 16 are supported on a support plate 39 supporting the control unit 23. (Parts including a control IC of the control unit 23 are not shown). Furthermore, the chargeable battery 25 for supplying power to the control unit 23, light source 13, etc. is disposed in the rear casing 30. The rear and front casings 30 and 33 are provided with ribs 40a, 40b, 41a and 41b acting as guides for guiding insertion of the memory package 17 into the image reader 11. Also, for convenience in handling of the image reader 11 during use, the memory connector 20 is disposed at a position biased toward the thumb as best shown in FIG. 5.

The operation of the image reader 11 of the document editing apparatus having the structure described above will now be described.

First, the power supply on-off switch 24 is turned on to supply power to the control unit 23, image sensor 12, light source 13, memory package 17, etc. Then, the image reader 11 is set on an original document 35 as shown in FIG. 3B and is moved on the original document 35 by the hand of an operator. The drive rollers 31a and 31b rotate, and, in synchronism with the rotation of these drive rollers 31a and 31b, the rotation angle of the drive rollers 31a and 31b (the amount of movement of the image reader (11) is detected by the combination of the slitted disc 32 and the rotation sensor 16 constituting an encoder, and a signal indicative of the detected rotation angle is applied from the encoder to the control unit 23 as a synchronizing signal. At the same time, the light source 13 is energized to emit a beam of light which illuminates the original document 35. The beam of light reflected from the original document 35 passes through the opening 34 and lens 36 and is focused on the image sensor 12 to be read as image data. This image data is supplied in the form of an analog signal to the control unit 23 in synchronism with the encoder output signal indicative of the detected rotation angle of the drive rollers 31a and 31b. This analog signal is then converted into a digital signal in the control unit 23, and the digital signal is stored in the memory package 17 inserted in the memory connector 20 supported on the support plate 39 supporting the control unit 23. (The memory package 17 employed in this embodiment includes a memory part only and does not include any internal control part. Therefore, the memory package 17 is externally controlled from the control unit 23. However, when the memory package 17 is of the type in which a microcomputer for control purpose is provided in addition to its memory part, the functional part for controlling the memory package 17 need not be provided in the control unit 23.) In connection with the storage of new image data in the memory package 17, there may be a case where various image data are already stored in the memory part of the memory package 17, and, because of insufficiency of the residual capacity of the memory part of the memory package 17, new image data cannot be stored in the memory package 17. To inform of the impossibility of storage of new image data in the memory package 17, the light-emitting diode 14 for displaying the insufficiency of the residual memory capacity is provided. For the purpose, the control unit 23 monitors the residual capacity of the memory contained in the package 17. This light-emitting diode 14 emits a flashing beam of light to inform the insufficiency of the residual memory capacity. When the insufficiency of the residual memory capacity of the memory part of the memory package 17 is indicated, that memory package 17 is withdrawn, and a new memory package 17 is inserted in the memory connector 20, so that the image data can be stored in the new memory package 17. When the image data read from the original document 35 has been completely stored in the new memory package 17, the light-emitting diode 14, having displayed the insufficiency of the residual memory capacity by the flashing beam of light, displays now the end of the image data storage operation by emitting a continuous beam of light. Thus, the light-emitting diode 14 displays the insufficiency of the residual memory capacity by flashing emission of light, while it displays the end of each image data storing operation by continuous emission of light, so that the single light-emitting diode 14 can display both of these two modes without requiring an additional one.

The sensor 21 detects whether or not the memory package 17 is set in the memory connector 20. The image data converted into the form of the digital signal in the control unit 23 is temporarily stored in the buffer memory 19 mounted on the support plate 39 supporting the control unit 23. When the memory ON switch 18 is turned on, the digital image data is transferred from the buffer memory 19 to the memory package 17 to be stored in the memory part of the memory package 17. When the image reader 11 reads new image data from the original document 35 without turning on the memory ON switch 18 (that is, without transferring the previous image data from the buffer memory 19 to the memory package 17), the new image data is temporarily stored in the buffer memory 19, and the previous image data, having been stored in the buffer memory 19, is erased.

When the movement of the image reader 11 on the original document 35 is stopped, the drive rollers 31a and 31b cease to rotate. At the same time, the slitted disc 32 ceases to rotate, and the rotation sensor 16 ceases to generate the synchronizing signal indicative of the angular rotation of the slitted disc 32. When the control unit 23 detects that the synchronizing signal from the rotation sensor 16 has not been applied for more than a predetermined period of time, the control unit 23 acts to deenergize the light source 13 so as to stop application of any image data from the image sensor 12.

The image reader 11 is moved by the hand of the operator to read image data from the original document 35. Therefore, the image data reading speed tends to change. Also, the image reading performance of the image sensor 12 is affected by the image data reading speed of the image reader 11. When the original document 35 is read by the image reader 11 in a state in which image data read by the image reader 11 cannot be displayed and confirmed on the CRT 2 disposed in the body 1 of the document editing apparatus (that is, in a state in which the signal cable 29 connecting the image reader 11 to the body 1 of the document editing apparatus is removed), the control unit 23 compares the output signal of the sensor 16 with a reference signal produced in the control unit 23 itself. When the result of comparison proves that the image data reading speed deviates from a predetermined speed range, the control unit 23 decides that the reading speed is abnormal and acts to energize the light-emitting diode 15 to display that the reading speed is abnormal.

When the abnormal reading speed is detected, the image reader 11 reads the original document 35 again, and, after comfirming the fact that image data is being normally read (that is, confirming that the light-emitting diode 15 does not emit light), the control unit 23 acts to turn on the memory ON switch 18 so as to transfer the image data from the buffer memory 19 to the memory package 17 to store the image data in the memory part of the memory package 17.

Unnecessary image data such as that read from the original document 35 for test purpose need not be stored in the memory package 17. Also, there may be image data whose storage is undesirable. Such unnecessary image data is not transferred from the buffer memory 19 to the memory package 17, but it is erased by storing new image data in the buffer memory 19, so that the memory capacity of the memory package 17 can be effectively used. The memory ON switch 18 applies such a selection instruction signal to the control unit 23.

When it is desired to retrieve image data stored in the memory package 17, the cable connector 28 of the image reader 11 is connected by the signal cable 29 to the cable connector 27 of the body 1 of the document editing apparatus, and all the image data stored in the memory package 17 are read out under control of the general control unit 10 provided in the body 1 of the document editing apparatus. Required image data are selectively extracted from among the entire image data instruction from the k/b 3. There are two methods for printing out the selected required image data. According to one of the methods, the image data are edited under control of the general control unit 10, and the edited data are printed out by the output unit 4. According to the other method, the signal cable 29 is not used, and the memory package 17 is removed from the memory connector 20 provided in the image reader 11. Then, the removed memory package 17 is inserted into the memory connector 7 provided in the body 1 of the document editing apparatus, and the required image data stored in the memory package 17 are similary read out and printed out. During storage of the image data in the memory package 17, image data numbers or the like for classifying the individual image data are preferably automatically attached to the heads of the individual image data under control of the control unit 23, so that the required image data can be read out from the memory package 17 and printed out under instruction from the K/B 3 which specifies the image data numbers of the required image data.

When the original document 35 is read by the image reader 11 in the state in which the image reader 11 is connected by the signal cable 29 to the body 1 of the document editing apparatus, there are two methods for storing image data. According to one of the methods, the image data is stored in the memory package 17. According to the other method, the image data is stored in the memory unit 5 provided in the body 1 of the document editing apparatus. One of these two methods is selected on the basis of the result of detection by the sensor 21 which detects whether or not the memory package 17 is inserted into the memory connector 20 provided in the image reader 11. When the sensor 21 detects that the memory package 17 is inserted into the memory connector 20 provided in the image reader 11, the image data is stored in the memory part of the memory package 17.

Figure 6:
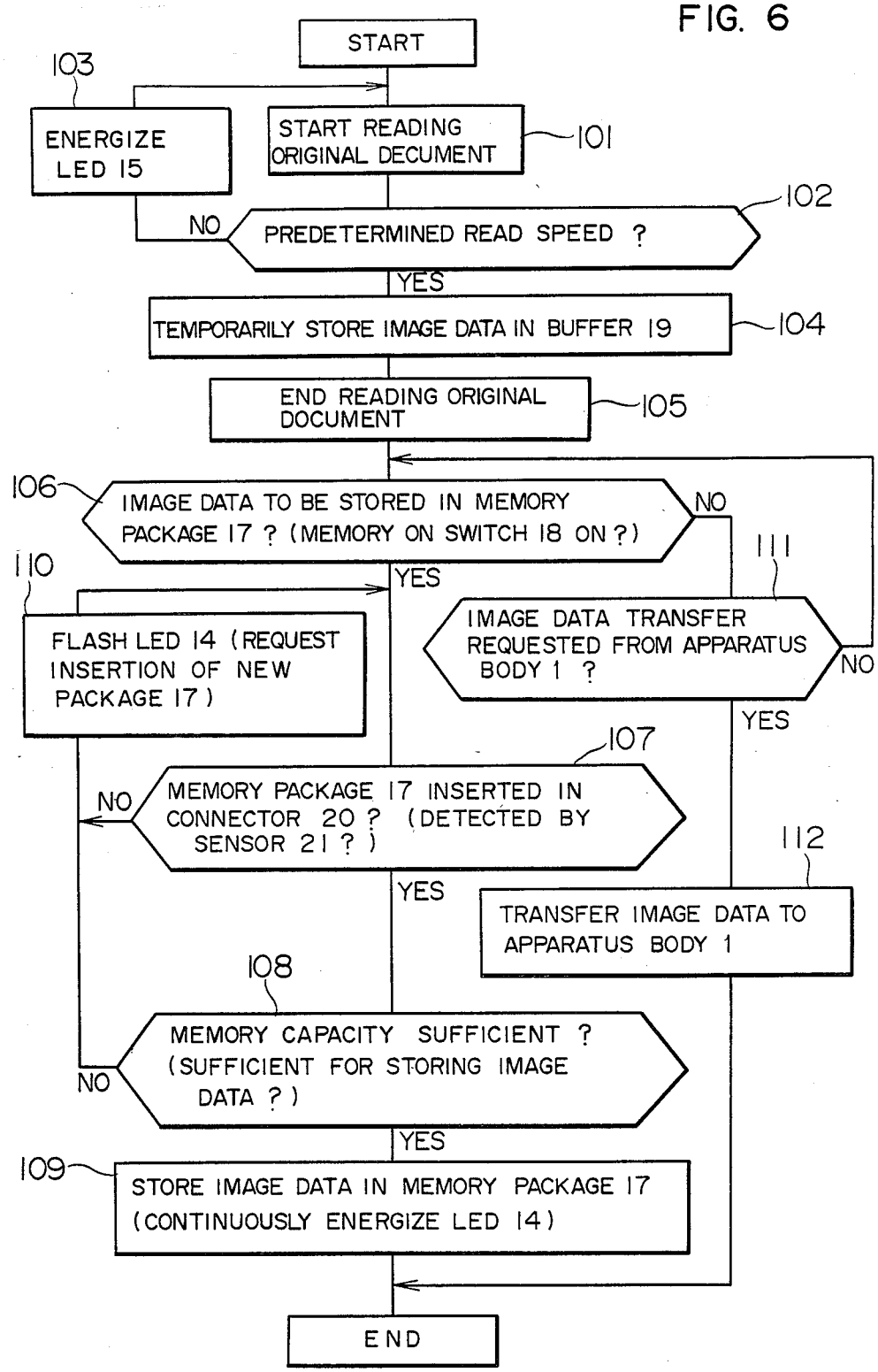
FIG. 6 is a flow chart showing the steps of control processing by the control circuit provided in the image reader.
Figure 7:
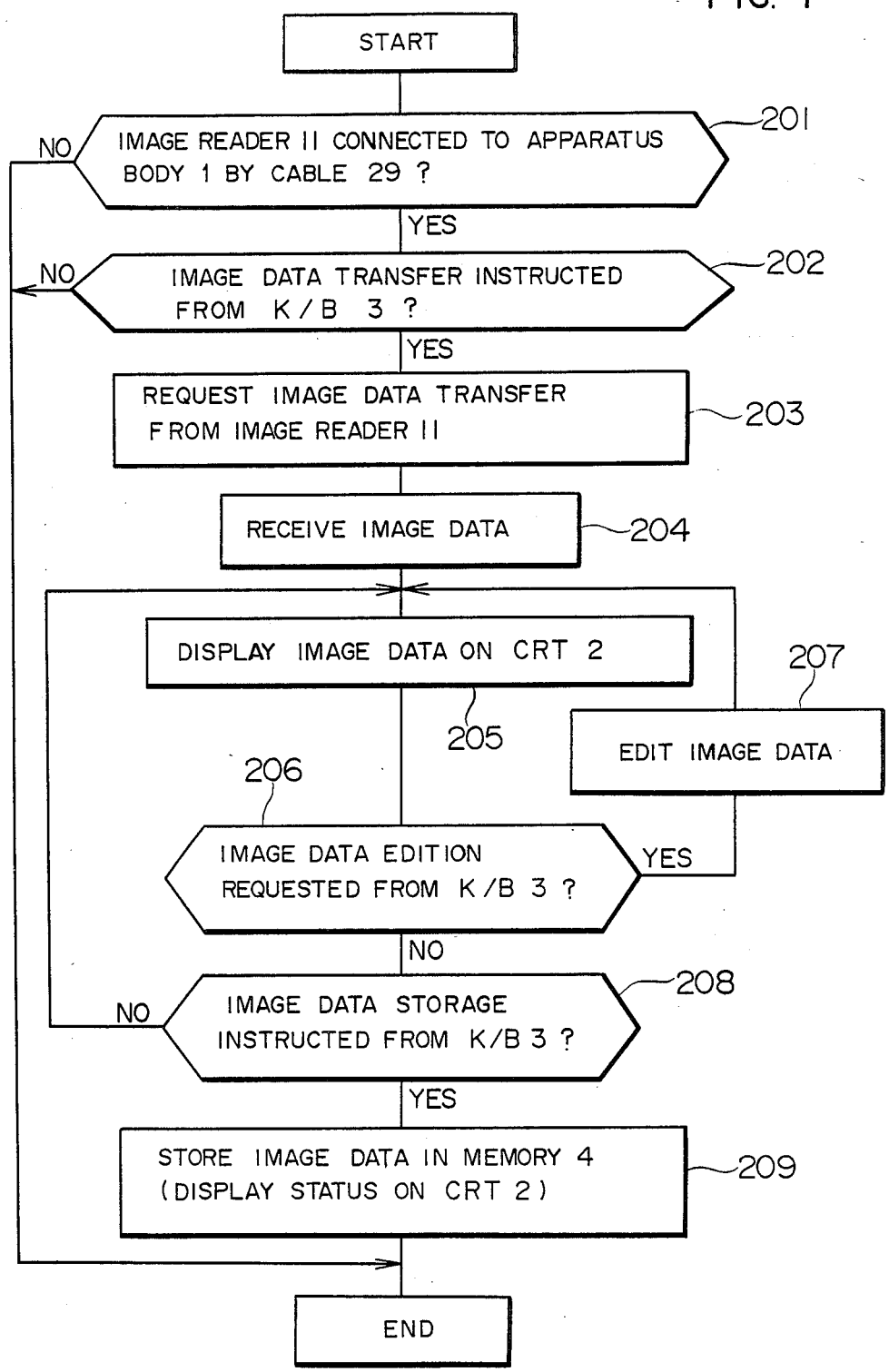
FIG. 7 is a flow chart showing the steps of control processing by the general control unit provided in the body of the document editing apparatus.

FIG. 6 is a flow chart showing the steps of control processing by the control unit 23 provided in the image reader 11, and FIG. 7 is a flow chart showing the steps of control processing by the general control unit 10 provided in the body 1 of the document editing apparatus.

The steps of control processing by the microprocessor incorporated in the control unit 23 provided in the image reader 11 will now be described with reference to FIG. 6.

Step 101

This step is a step of initialization executed when the power supply on-off switch 24 is turned on so that the buffer memory 19 is rendered at the initial condition ready for writing data as received, and the image sensor 12 and the light source of the sensor 16 are energized. Then, the control unit 23 checks generation of the synchronizing signal from the rotation sensor 16. Upon detection of the generation of the synchronizing signal from the rotation sensor 16, the light source 13 is energized to start the original document reading operation.

Step 102

The control unit 23 compares the period of generation of the synchronizing signal from the rotation sensor 16 with the reference signal to check whether or not the moving speed (the reading speed) of the image reader 11 lies within the predetermined range.

Step 103

When the result of checking in the step 102 proves that the reading speed does not lie within the predetermined range, the light-emitting diode 15 is energized to indicate that the reading speed is abnormal, and the program returns to the step 101.

Step 104

An image signal generated in the form of an analog signal from the image sensor 12 in synchronism with the synchronizing signal is converted into a digital signal, and this digital signal is temporarily stored in the buffer memory 19.

Step 105

The control unit 23 monitors the generation period of the synchronizing signal, and, when the synchronizing signal disappears for more than the predetermined period of time, the application of the image signal to the control unit 23 is stopped. The control unit 23 deenergizes the light source 13 to end the reading operation.

Step 106

The control unit 23 checks whether or not the memory ON switch 18 has been turned on so as to confirm whether or not the image data temporarily stored in the buffer memory 19 is to be stored in the memory package 17.

Step 107

When the result of checking in the step 106 shows that the memory ON switch 18 has been turned on, the control unit 23 monitors the output signal of the sensor 21 so as to confirm whether the memory package 17 which stores the image data temporarily stored in the buffer memory 19 is inserted into the memory connector 20.

Step 108

When the result of confirmation in the step 107 shows that the memory package 17 is inserted into the memory connector 20, the control unit 23 compares the residual memory capacity of the memory package 17 with the quantity of the image data to be stored in the memory package 17 so as to check whether or not the residual memory capacity is sufficient for storing the image data.

Step 109

When the result of checking in the step 108 shows that the residual memory capacity of the memory package 17 inserted in the memory connector 20 is sufficient for storing the image data, the image data temporarily stored in the buffer memory 19 is transferred to and stored in the memory package 17. At the same time, the light-emitting diode 14 emits a continuous beam of light to display that the image data is being transferred to and stored in the memory package 17.

Step 110

When the result of the step 107 shows that the memory package 17 is not inserted into the memory connector 20, or when the result of checking in the step 108 shows that the residual memory capacity of the memory package 17 is not sufficient for storing the image data, the light-emitting diode 14 emits a flashing beam of light to indicate that the memory package 17 needs to be replaced by a new one. Then, the program returns to the step 107.

Step 111

When the result of checking in the step 106 shows that the memory ON switch 18 has not been turned on, the control unit 23 checks whether or not a request for image data transfer has been issued from the body 1 of the document editing apparatus. When the result of this checking shows that there is not such a request, the program returns to the step 106.

Step 112

On the other, when the result of checking in the step 111 shows that such a request for image data transfer has been issued from the body 1 of the document editing apparatus, the image data temporarily stored in the buffer memory 19 or the image data stored already in the memory package 17 is transferred to the body 1 of the document editing apparatus.

The steps of control processing by the microprocessor incorporated in the general control unit 10 provided in the body 1 of the document editing apparatus will now be described with reference to FIG. 7.

Step 201

The level of the READY signal is checked to confirm whether or not the image reader 11 is connected by the signal cable 29 to the body 1 of the document editing apparatus.

Step 202

When the result of checking in the step 201 shows that the image reader 11 is connected by the signal cable 29 to the body 1 of the document editing apparatus, the general control unit 10 checks whether or not a control instruction instructing transfer of image data from the image reader 11 to the body 1 of the document editing apparatus has been generated from the K/B 3.

Step 203

When the result of checking in the step 202 shows that the control instruction for image data transfer has been generated from the K/B 3, the general control unit 10 sends an image-data transfer request signal to the image reader 11.

Step 204

Image data transferred from the image reader 11 is received and temporarily stored in the internal buffer memory of the general control unit 10.

Step 205

The image data temporarily stored in the internal buffer memory is displayed on the CRT 2.

Step 206

The general control unit 10 checks whether or not a processing instruction instructing editing of the image data has been generated from the K/B 3.

Step 207

When the result of checking in the step 206 shows that the image-data editing processing instruction has been generated from the K/B 3, the editing process is executed according to the instruction, and the program returns to the step 205. The editing process includes modification, such as addition, deletion and revision, of the image data displayed on the CRT 2. When the program returns to the step 205 after the process has been executed, the modified image data is displayed.

Step 208

When the result of checking in the step 206 shows that the image-data editing processing instruction has not been generated from the K/B 3, the general control unit 10 checks whether or not an instruction instructing storage of the image data has been generated from the K/B 3. When the result of this checking shows that the image-data storage instruction has not been generated from the K/B 3, the program returns to the step 205.

Step 209

On the other hand, when the result of checking in the step 208 shows that the image-data storage instruction has been generated from the K/B 3, the general control unit 10 acts to store the image data in the memory unit 5 or memory package 6 according to the instruction applied from the K/B 3.

We claim:

1. A document editing apparatus comprising an apparatus body including means for displaying, editing and storing image data; an image reader disposed separately from said apparatus body so as to be freely movable over an original document; and a detachable signal cable for detachably connecting said image reader to said apparatus body, said image reader including:
an image sensor for photoelectrically converting characters and patterns drawn on the original document into image data;
memory connecting means adapted to detachably receive an externally inserted, card-type semiconductor memory integrated circuit package, to connect the package to said image reader;

package detachment detecting means for detecting whether a semiconductor memory integrated circuit package is connected to said memory connecting means;

selector switch means for selecting image data to be stored in a semiconductor memory integrated circuit package connected to said memory connecting means;

memory status indicating means for indicating the status of available memory space in a semiconductor memory integrated circuit package connected to said memory connecting means; and a control circuit connected to said memory connecting means, said package detachment detecting means, said selector switch means, and said memory status indicating means and including first means responsive to the output signal from said package detachment detecting means and to the selection by said selector switch means of image data to be stored in a semiconductor memory integrated circuit package for determining whether a semiconductor memory integrated circuit package is connected to said memory connecting means, second means responsive to a determination that a semiconductor memory integrated circuit package is connected to said memory connecting means for comparing the residual memory capacity of the connected semiconductor memory integrated circuit package with the quantity of image data to be stored, and third means responsive to a determination that no semiconductor memory integrated circuit package is connected to said memory connecting means or that the residual memory capacity of the connected semiconductor memory integrated circuit package is insufficient for storing the image data to be stored for actuating said memory status indicating means to indicate an abnormal memory status.

2. A document editing apparatus comprising an apparatus body including means for displaying image data, an editing keyboard, means for storing image data, a general control unit for controlling said displaying means, said keyboard, and said storing means in response to instruction inputs applied from said keyboard; an image reader disposed separately from said apparatus body so as to be freely movable over an original document; and a detachable signal cable for detachably connecting said image reader to said apparatus body, said image reader including:
an image sensor for photoelectrically converting characters and patterns drawn on the original document into image data;
buffer memory means for temporarily storing image data;
memory connecting means adapted to detachably receive an externally inserted, card-type semiconductor memory integrated circuit package, to connect the package to said image reader;
package detachment detecting means for detecting whether a semiconductor memory integrated circuit package is connected to said memory connecting means;
selector switch means for selecting image data to be stored in a semiconductor memory integrated circuit package connected to said memory connecting means;
memory status indicating means for indicating the status of available memory space in a semiconductor memory integrated circuit package connected to said memory connecting means; and
a control circuit connected to said buffer memory means, said memory connecting means, said package detachment detecting means, said selector switch means and said memory status indicating means and including first means responsive to the output signal from said package detachment detecting means and to the selection by said selector switch means of image data to be stored in a semiconductor memory integrated circuit package for determining whether a semiconductor memory integrated circuit package is connected to said memory connecting means, second means responsive to a determination that a semiconductor memory integrated circuit package is connected to said memory connecting means for comparing the residual memory capacity of the connected semiconductor memory integrated circuit package with the quantity of image data to be stored, and third means responsive to a determination that no semiconductor memory integrated circuit package is connected to said memory connecting means or that the residual memory capacity of the connected semiconductor memory integrated circuit package is insufficient for storing the image data to be stored for actuating said memory status indicating means to indicate an abnormal memory status.

3. A document editing apparatus comprising an apparatus body including means for displaying image data, an editing keyboard, means for storing image data, a general control unit for controlling said displaying means, said keyboard and said storing means in response to instruction inputs applied from said keyboard; an image reader disposed separately from said apparatus body so as to be freely movable over an original document; and a detachable signal cable for detachably connecting said image reader to said apparatus body, said image reader including:
movement detecting means for providing a synchronizing signal indicative of movement of said image reader over the original document;
an image sensor for photoelectrically converting characters and patterns drawn on the original document into image data in accordance with the synchronizing signal;
memory connecting means for adapted to detachably receive an externally inserted, card-type semiconductor memory integrated circuit package to connect the package to said image reader;
package detachment detecting means for detecting whether a semiconductor memory integrated circuit package is connected to said memory connecting means;
selector switch means for selecting image data to be stored in a semiconductor memory integrated circuit package connected to said memory connecting means;
memory status indicating means for indicating the status of available memory space in a semiconductor memory integrated circuit package connected to said memory connecting means;

abnormal reading indicating means for indicating abnormal reading; and a control circuit connected to said memory connecting means, said package detachment detecting means, said selector switch means, said memory status indicating means and said abnormal reading indicating means and including means responsive to said synchronizing signal for determining whether a reading operation is normal or abnormal, actuating said abnormal reading indicating means in response to a determination that the reading operation is abnormal, selecting image data to be stored in response to the output from said selector switch means and the determination that the reading operation is normal, confirming whether a semiconductor memory integrated circuit package is connected to said memory connecting means on the basis of an output signal from said package detachment detecting means when the selected image data is to be stored in said semiconductor memory integrated circuit package, comparing, when the connection is confirmed, the residual memory capacity of the connected semiconductor memory integrated circuit package with the quantity of image data to be stored, and actuating said memory status indicating means to indicate an abnormal status when no semiconductor memory integrated circuit package is connected to said memory connecting means or when the residual memory capacity of the connected semiconductor memory integrated circuit package is insufficient for storing the image data to be stored.

4. A document editing apparatus comprising an apparatus body including means for displaying image data, an editing keyboard, means for storing image data, a general control unit for controlling said displaying means, said keyboard and said storing means in response to instruction inputs applied from said keyboard; an image reader disposed separately from said apparatus body so as to be freely movable over an original document; and a detachable signal cable for detachably connecting said image reader to said apparatus body, said image reader including:
movement indicating means for providing a synchronized signal indicative of movement of said image reader over the original document;
an image sensor for photoelectrically converting characters and patterns drawn on the original document into image data in accordance with the synchronizing signal;
cable connection detecting means for detecting whether said image reader is connected to said apparatus body by said signal cable or not;
buffer memory means for temporarily storing image data produced on the basis of an output of said image sensor;
memory connecting means adapted to detachably receive an externally inserted, card-type semiconductor memory integrated circuit package to connect the package to said image reader;
package detachment detecting means for detecting whether a semiconductor memory integrated circuit package is connected to said memory connecting means;
selector switch means for selecting image data to be stored in a semiconductor memory integrated circuit package connected to said memory connecting means;
memory status indicating means for indicating the status of available memory space in a semiconductor memory integrated circuit package connected to said memory connecting means; and a control circuit connected to said buffer memory means, said memory connecting means, said package detachment means, said selector switch means and said memory status indicating means and including means for storing, in said buffer memory means, the image data produced on the basis of the output of said image sensor; means responsive to an image-data transfer request from said apparatus body for transferring the image data from said image reader to said apparatus body; means for confirming whether a semiconductor memory integrated circuit package is connected to said memory connecting means on the basis of an output signal from said package detachment detecting means when the selected image data is to be transferred from said buffer memory means and stored in said semiconductor memory integrated circuit package; means for comparing, when the connection is confirmed, the residual memory capacity of the connected semiconductor memory integrated circuit package with the quantity of image data to be stored; and means for actuating said memory status indicating means to indicate an abnormal status when no semiconductor memory integrated circuit package is connected to said memory connecting means or when the residual memory capacity of the connected semiconductor memory integrated circuit package is insufficient for storing the image data to be stored;

said general control unit including means for confirming whether said image reader is connected to said apparatus body by said signal cable on the basis of the result of detection by said cable connection detecting means; means for requesting, when the connection is confirmed, transfer of image data from said image reader according to an instruction input applied from said keyboard; means for receiving the image data transferred from said image reader; means for displaying the received image data; and means for editing and storing the image data according to instruction inputs applied from said keyboard.

5. A document editing apparatus according to claim 4, wherein said control means further includes means responsive to a request for image data transfer from said apparatus body, for transferring the image data stored in said buffer memory means to said apparatus body.

6. A document editing apparatus comprising an apparatus body including means for displaying image data, an editing keyboard, means for storing image data, a general control unit for controlling said displaying means, said keyboard, and said storing means in response to instruction inputs applied from said keyboard; an image reader disposed separately from said apparatus body so as to be freely movable over an original document; and a detachable signal cable for detachably connecting said image reader to said apparatus body, said image reader including:
movement detecting means for providing a synchronizing signal indicative of movement of said image reader over the original document;

an image sensor for photoelectrically converting characters and patterns drawn on the original document into image data in accordance with the synchronizing signal;

buffer memory means for temporarily storing image data produced on the basis of an output from said image sensor;

memory connecting means adapted to detachably receive an externally inserted, card-type semiconductor memory integrated circuit package to connect the package to said image reader;

package detachment detecting means for detecting whether a semiconductor memory integrated circuit package is connected to said memory connecting means;

selector switch means for selecting image data to be stored in a semiconductor memory integrated circuit package connected to said memory connecting means;

memory status indicating means for indicating the status of available memory space in a semiconductor memory integrated circuit package connected to said memory connecting means;

abnormal reading indicating means for indicating abnormal reading; and a control circuit connected to said memory connecting means, said package detachment detecting means, said selector switch means, said memory status indicating means and said abnormal reading indicating means and including means for temporarily storing the image data in said buffer memory means; means for monitoring the synchronizing signal to decide whether a reading operation is normal or abnormal; means for actuating said abnormal reading indicating means when the reading operation is abnormal; means for confirming whether a semiconductor memory integrated circuit package is connected to said memory connecting means on the basis of an output signal from said package detachment detecting means, when the reading operation is normal, and the selected image data is to be stored in said semiconductor memory integrated circuit package; means for comparing, when the connection is confirmed, the residual memory capacity of the connected semiconductor memory integrated circuit package with the quantity of image data to be stored; and means for actuating said memory status indicating means for indicate an abnormal status when no semiconductor memory integrated circuit package is connected to said memory connecting means or when the residual memory capacity of the connected semiconductor memory integrated circuit package is insufficient for storing the image data to be stored; and means for transferring the image data temporarily stored in said buffer memory means to the connected semiconductor memory integrated circuit package to store the image data in the connected package when the residual memory capacity of the connected package is sufficient for storing the image data.

* * * * *